United States Patent
Choi

(10) Patent No.: US 11,201,548 B2
(45) Date of Patent: Dec. 14, 2021

(54) SINGLE-STAGE INTERLEAVED SOFT SWITCHING CONVERTER

(71) Applicant: FOUNDATION FOR RESEARCH AND BUSINESS, SEOUL NATIONAL UNIVERSITY OF SCIENCE AND TECHNOLOGY, Seoul (KR)

(72) Inventor: Se Wan Choi, Seoul (KR)

(73) Assignee: Foundation for Research and Business, Seoul National University of Science and Technology, Seoul (KR)

(*) Notice: Subject to any disclaimer, the term of this patent is extended or adjusted under 35 U.S.C. 154(b) by 214 days.

(21) Appl. No.: 16/469,692

(22) PCT Filed: Jul. 5, 2017

(86) PCT No.: PCT/KR2017/007192
§ 371 (c)(1),
(2) Date: Jun. 14, 2019

(87) PCT Pub. No.: WO2018/110787
PCT Pub. Date: Jun. 21, 2018

(65) Prior Publication Data
US 2020/0083814 A1    Mar. 12, 2020

(30) Foreign Application Priority Data

Dec. 15, 2016  (KR) .................. 10-2016-0171810
Dec. 15, 2016  (KR) .................. 10-2016-0171811
(Continued)

(51) Int. Cl.
*H02M 3/335* (2006.01)
*H02J 7/02* (2016.01)
(Continued)

(52) U.S. Cl.
CPC ......... *H02M 3/33569* (2013.01); *B60L 53/22* (2019.02); *H02J 7/022* (2013.01);
(Continued)

(58) Field of Classification Search
CPC .... H02M 3/33569; H02M 3/335; H02M 7/06; H02M 2001/0058; H02M 1/14;
(Continued)

(56) References Cited

U.S. PATENT DOCUMENTS 6,330,170 B1 * 12/2001 Wang ..................... H02J 9/062
                                                  363/17
6,343,021 B1 *  1/2002 Williamson ........... H02M 1/10
                                                  363/163
(Continued)

FOREIGN PATENT DOCUMENTS

| JP | 2010-110114 A | 5/2010 |
|---|---|---|
| KR | 10-2016-0115648 A | 10/2016 |
| WO | WO 2015-095699 A1 | 6/2015 |

OTHER PUBLICATIONS

Minjae Kim et al., "A Single-stage Interleaved Soft-switching On-board Charger with Low Frequency-less Transformer", published in the Korean Institute of Power Electronics (KIPE) on Jul. 5, 2016, pp. 275-276.
(Continued)

*Primary Examiner* — Richard Isla
*Assistant Examiner* — Dung V Bui
(74) *Attorney, Agent, or Firm* — Rabin & Berdo, P.C.

(57) ABSTRACT

According to a single-stage interleaved software switching converter, power factor is controlled and battery charging and current are integrally controlled on the basis of a PFC circuit of a single-stage interleaving type so that efficiency of a charging device is enhanced and the cost is reduced. Further, it is possible to remove harmful electromagnetic
(Continued)

radiation; enhance power density and durability by using a film-type capacitor instead of the conventional electrolytic capacitor; reduce switching loss by soft switching operation and to reduce the volume of a filter unit; design magnetizing current to be small by removing a low-frequency component of a transformer and to reduce the volume; and perform high-power charging according to the number of windings of the transformer.

17 Claims, 14 Drawing Sheets

(30) Foreign Application Priority Data

Jul. 5, 2017 (KR) .......................... 10-2017-0085541
Jul. 5, 2017 (KR) .......................... 10-2017-0085542

(51) Int. Cl.
  *H02M 7/06* (2006.01)
  *H02M 1/42* (2007.01)
  *H02M 1/14* (2006.01)
  *H02M 1/44* (2007.01)
  *B60L 53/22* (2019.01)
  *H02M 1/00* (2006.01)

(52) U.S. Cl.
  CPC ............ *H02M 1/14* (2013.01); *H02M 1/4225* (2013.01); *H02M 1/44* (2013.01); *H02M 7/06* (2013.01); *B60L 2210/30* (2013.01); *B60L 2210/40* (2013.01); *B60L 2240/547* (2013.01); *B60L 2240/549* (2013.01); *H02M 1/0058* (2021.05)

(58) Field of Classification Search
  CPC ........ H02M 1/42; H02M 1/44; H02M 1/4225; H02J 7/022; H02J 7/02; B60L 53/22; B60L 2210/30; B60L 2210/40; B60L 2240/547; B60L 2240/549

USPC ......................................................... 320/140
See application file for complete search history.

(56) References Cited

U.S. PATENT DOCUMENTS

| | | | | |
|---|---|---|---|---|
| 7,719,246 | B2* | 5/2010 | Melanson | H02M 1/4225 323/282 |
| 8,212,493 | B2* | 7/2012 | Melanson | H02M 3/3374 315/247 |
| 8,654,483 | B2* | 2/2014 | Etter | H02M 1/32 361/18 |
| 2003/0102845 | A1 | 6/2003 | Aker et al. | |
| 2008/0278985 | A1* | 11/2008 | Ribarich | H03F 3/217 363/127 |
| 2011/0051468 | A1 | 3/2011 | Kyono | |
| 2011/0292703 | A1* | 12/2011 | Cuk | H02M 1/4258 363/126 |
| 2012/0257429 | A1* | 10/2012 | Dong | H02M 3/1582 363/127 |
| 2013/0051102 | A1* | 2/2013 | Huang | H02M 7/217 363/127 |
| 2013/0057200 | A1* | 3/2013 | Potts | H02J 50/12 320/107 |
| 2013/0169176 | A1* | 7/2013 | Pan | H05B 45/37 315/200 R |
| 2013/0194838 | A1* | 8/2013 | Jang | H02M 1/4216 363/37 |
| 2014/0177295 | A1* | 6/2014 | Jang | H02M 1/4225 363/44 |
| 2015/0365005 | A1* | 12/2015 | Panov | H02M 1/40 307/24 |
| 2016/0241132 | A1 | 8/2016 | Lin et al. | |
| 2016/0285353 | A1 | 9/2016 | Kim et al. | |

OTHER PUBLICATIONS

Byeongwoo Kim et al., "A Single-stage Electrolytic Capacitor-less Interleaved Totem-pole Soft-switching AC-DC Converter with EV Charger", published in the Korean Institute of Power Electronics (KIPE) on Nov. 25, 2016, pp. 25-26.

* cited by examiner

Basic concept diagram of expansion 2 phases within single-phase input module (a)

Basic concept diagram of expansion within single-phase input module
(increase by 1 phase, ex) 3 phases, 4 phases, and 5 phases)

(b)

Basic concept diagram of expansion within single-phase input module
(increase in even numbers by 2 phases, ex) 4 phases, 6 phases, and 8 phases)
*Even-numbered inductor coupling Detailed concept description of expansion within single-phase input module
(only increase in even numbers by 2 phases, ex) 4 phases, 6 phases, and 8 phases)

a. Case of combining secondary side of transformer

Series structure (a)

Parallel structure (b)

b. Case of combining secondary-side diode bridge (a)

Parallel structure (b)

Mode($t_0$~$t_1$)

Mode($t_1$~$t_2$)

Mode($t_2$~$t_3$)

Mode($t_3$~$t_4$)

SINGLE-STAGE INTERLEAVED SOFT SWITCHING CONVERTER

SPECIFIC REFERENCE TO A GRACE PERIOD INVENTOR DISCLOSURE

This invention has been published in the Korean Institute of Power Electronics (KIPE) on Jul. 5, 2016 and Nov. 25, 2016.

TECHNICAL FIELD

The present invention relates generally to a single-stage interleaved soft switching converter. More particularly, the present invention relates to a technology in which through a soft switching technique of a switching unit of an interleaving PFC circuit, a large-capacity charger is possible and simultaneously, it is possible to cancel a low-frequency component of a transformer and to remove harmful electromagnetic radiation, and it is possible to minimize the number of components of a charging device.

BACKGROUND ART

Recently, research into the practical use of electric vehicles has been widely conducted. An electric vehicle receives electric energy from outside to charge a battery and then obtains power which is mechanical energy through a motor coupled with the wheels by the voltage of the charged battery.

That is, the electric vehicle uses a large-capacity rechargeable battery so that the motor operates with the voltage of the charged battery, and is provided with a battery charging device to charge such a large-capacity rechargeable battery.

Battery charging devices are divided into a rapid charger and a slow charger depending on charging time. The rapid charger is installed in a place such as a gas station for urgent charging during driving, and it takes about 20 minutes for charging a battery. On the other hand, the slow charger is installed in a place such as a parking lot, a shopping mall, or the like, where long-term parking is expected. It takes about five hours for charging a battery.

This battery charging device cannot use all of the AC input voltage of 110 V/220 V from a commonly-used power source and uses only a single AC input voltage (single input), and the range of voltage output for battery charging is narrow.

In addition, the conventional vehicle-mounted charger uses a two-stage method consisting of a power factor correction (PFC) circuit for power-factor improvement and a DC-DC converter. Therefore, in order to satisfy high power density, high efficiency, and low cost, a single-stage method in which a PFC circuit and a DC-DC converter are integrated may be considered.

The conventional single-stage methods are classified into a DCM method and a CCM method. When the charging capacity is small, DCM flyback and forward converters are used, so that the number of elements is small and soft switching is performed, resulting in high charging efficiency. However, in the case of large capacity, a CCM full-bridge converter is used and soft switching is possible, but there is a problem that the volume and loss of a transformer are increased due to a low-frequency component of the transformer.

The applicant of the present invention intends to propose a method where a structure using an interleaving PFC circuit with the CCM method is adopted so that through a soft switching technique, a large-capacity charger is possible, and simultaneously, the low-frequency component of the transformer is canceled, harmful electromagnetic radiation is removed, and the number of components of the charging device is reduced.

DISCLOSURE

Technical Problem

The present invention has been made keeping in mind the above problems occurring in the related art, and the present invention is intended to propose a single-stage interleaved soft switching converter wherein a dual-structure converter having the conventional PFC stage and an insulation stage for charging a battery with AC power which has passed through the PFC stage is designed into a single stage, so that it is possible to minimize the number of components of a charging device for an electric vehicle and to manufacture an interleaving PFC circuit of a single input type which has a switching unit as at least one module with expandability for multiple phases.

Also, the present invention is intended to propose a single-stage interleaved soft switching converter wherein power factor is controlled and battery charging and current are integrally controlled to reduce a ripple for multiple phases and to reduce switching loss so that it is possible to maximize efficiency of the charging device, and wherein the total number of components is reduced so that it is possible to reduce the volume and to reduce cost.

Also, the present invention is intended to propose a single-stage interleaved soft switching converter capable of removing harmful electromagnetic radiation and of enhancing power density and durability by using a film-type capacitor instead of the conventional electrolytic capacitor.

Also, the present invention is intended to propose a single-stage interleaved soft switching converter being capable of designing magnetizing current to be small by removing a low-frequency component of a transformer, of reducing the volume, and of performing high-power charging according to the number of windings of a transformer.

Also, the present invention is intended to propose a single-stage interleaved soft switching converter wherein diodes of a rectifying unit and a shaping unit are provided as FET switching elements so that battery charging voltage is provided to a system by an interleaving PFC circuit of a single input type, whereby bidirectional converting is possible.

Technical Solution

In order to achieve the above object, there is provided a single-stage interleaved soft switching converter including:
a rectifying unit converting input AC power of a system into DC power;
an interleaving power factor correction (PFC) circuit provided to an output side of the rectifying unit, to control power factor and battery charging and current by single-stage soft switching;
a filter unit having a third coil and a fourth coil, provided to an output side of the interleaving PFC circuit in parallel, to remove a pre-determined frequency component;
a transformer provided between an input side and an output side of the fourth coil of the filter unit, to increase an output voltage of the filter unit according to a turns ratio thereof;

a shaping unit provided to an output side of the transformer to shape increased AC output power of the transformer;

a link unit outputting a DC link voltage and providing the output link voltage to a battery by charging and discharging the output power of the shaping unit through a capacitor; and a control unit generating and providing a switching signal for controlling switching elements of the interleaving PFC circuit, thereby controlling output voltage and current of the battery.

The rectifying unit may be provided with a full-wave bridge circuit including a first diode D1 to a fourth diode D4, or may be provided with a half bridge circuit in a totem-pole structure including a first diode D1 and a second diode D2 in order to reduce the number of components.

The interleaving PFC circuit may include: a PFC unit having a first coil and a second coil, provided to the output side of the rectifying unit to correct power factor of an output voltage of the rectifying unit; a switching unit having: first and fourth switching elements S1 and S4 provided to an output side of the first coil in parallel and operating in a complementary manner, and second and third switching elements S2 and S3 provided to an output side of the second coil L2 in parallel and operating in a complementary manner; and a clamping unit having a capacitor between the second switching element and the third switching element to clamp output power which has passed through the switching unit.

The first switching element S1 and the second switching element S2 may be composed of FETs and diodes having the same polarity. The third switching element S3 and the fourth switching element S4 may be composed of FETs and diodes having the same polarity that is opposite to the polarity of the first switching element S1 and the second switching element S2. On the basis of the switching signal of the control unit, the first switching element S1 and the second switching element S2 may operate in a complementary manner and the third switching element S3 and the fourth switching element S4 may operate in a complementary manner.

The clamping unit may be of a film form to enhance power density and durability.

The shaping unit may include a fifth diode D5 and a seventh diode D7 that are connected to a first output side and a second output side of a secondary side coil of the transformer, respectively, and connected to an input side of the battery Vbat, and a sixth diode D6 and an eighth diode D8 that are connected between an output side of the battery Vbat and each of the first output side and the second output side of the secondary side coil of the transformer 400. The link unit may include a capacitor Co connected between an output side of the fifth diode D5 and of the seventh diode D7 and an input side of the sixth diode D6 and of the eighth diode D8, the capacitor linking an output voltage of the fifth diode D5 to the eighth diode D8 to the battery Vbat.

The rectifying unit may be composed of a first FET switching element and a second FET switching element that operate in a complementary manner to convert a DC voltage of the battery into an AC voltage for provision to the interleaved PFC circuit. The shaping unit may be composed of a third FET switching element to a sixth FET switching element.

The single-stage interleaved soft switching converter may be provided in such a manner to set the number of the coils of the PFC unit, the number of the switching elements of the switching unit, the number of the transformers, and the number of the diodes of the shaping unit on the basis of an output phase desired to be expanded.

The single-stage interleaved soft switching converter may further include a coupler coupling the first coil and the second coil of the PFC unit when there is an even number of expanded phases. Each transformer for each phase may be provided with series connection in which at a secondary side, one end of a first winding coil may access one end of a second winding coil, or with parallel connection in which at the secondary side, the one end of the first winding coil may access the one end of the second winding coil and at the secondary side, the other end of the first winding coil may be composed to the other end of the second winding coil.

The shaping unit for each phase may be combined in series or in parallel between each transformer for each phase and the battery.

The single-stage interleaved soft switching converter may be provided in a plurality of single-phase input modules, and each of the single-phase input modules may be provided in one among a serial form and a parallel form. Alternatively, the single-stage interleaved soft switching converter may be provided in a plurality of multi-phase input modules, and each of the multi-phase input modules may be provided in series or in parallel.

Advantageous Effects

According to the present invention, an interleaving PFC circuit is formed with respect to a single input power supply of a charging device for an electric vehicle so that power factor is controlled and battery charging and current are integrally controlled, whereby it is possible to enhance efficiency of the charging device and to reduce cost. Also, it is possible to remove harmful electromagnetic radiation. It is possible to enhance power density and durability by using a film-type capacitor instead of the conventional electrolytic capacitor. It is possible to reduce switching loss by soft switching operation and to reduce the volume of a filter unit.

Also, according to the present invention, it is possible to design magnetizing current to be small by removing a low-frequency component of the transformer, to reduce the volume, and to perform high-power charging according to the number of windings of the transformer.

Also, a dual-structure converter having the conventional PFC stage and the insulation stage for charging the battery with DC power obtained by converting AC power passed through the PFC stage is designed into a single stage, and a full-wave bridge circuit of the rectifying unit is designed into a half bridge circuit and the switching unit is designed into a totem-pole structure, whereby it is possible to minimize the number of components of the charging device. It is possible to have expandability for multiple phases. It is possible to enable manufacture into one chip in a single module form so that reduction in weight, thickness, length, and size is possible.

According to the present invention, in the interleaving PFC circuit of the single input type, the rectifying unit and the fifth to the eighth diodes of the shaping unit are provided as FET switching elements so that it is possible to charge the battery in the system and to perform bidirectional converting in which battery charging voltage is provided to the system.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Figure 1:
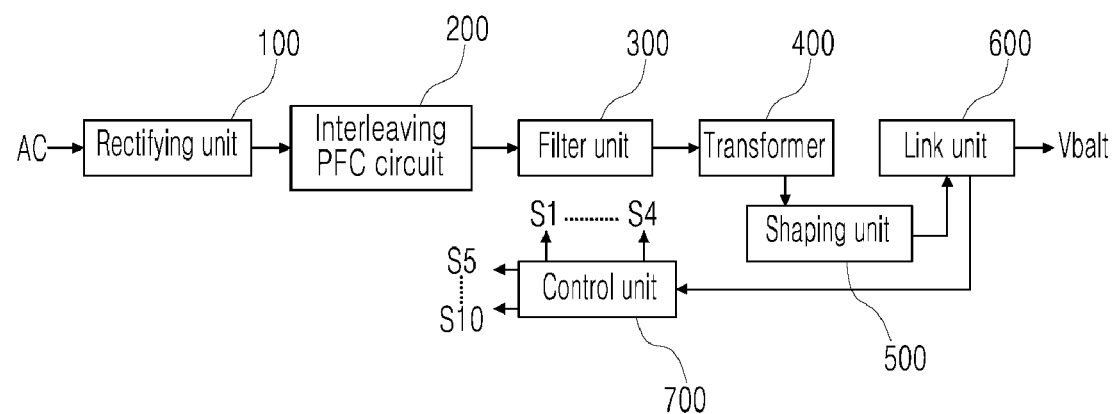
FIG. 1 is a diagram illustrating a schematic configuration of a charging device for an electric vehicle according to an embodiment of the present invention.

Hereinafter, embodiments of the present invention will be described in detail with reference to the drawings.

Advantages and features of the present invention, and methods to achieve them will be apparent from the following embodiments that will be described with reference to the accompanying drawings. It should be understood that the present invention is not limited to the following embodiments and may be embodied in different ways, and that the embodiments are given to provide complete disclosure of the invention and to provide a thorough understanding of the present invention to those skilled in the art. The scope of the present invention is defined only by the claims.

Terms used herein will now be briefly described, and embodiments of the present invention will be described in detail.

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description of the invention. Thus, the terms used herein have to be defined based on the meaning of the terms together with the description throughout the specification.

Throughout the specification, when a part "includes" an element, it is noted that it further includes other elements, but does not exclude other elements, unless specifically stated otherwise. Further, the term "unit" used in the specification means a software component or hardware component such as an FPGA or an ASIC, and performs a specific function. However, the term "unit" is not limited to software or hardware. The term "unit" may be formed so as to be in an addressable storage medium, or may be formed so as to operate one or more processors.

Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, and variables. A function provided by the components and "units" may be associated with the smaller number of components and "units", or may be divided into additional components and "units".

Hereinbelow, embodiments of the present invention will be described in detail with reference to the accompanying drawings such that the present invention can be easily embodied by those skilled in the art to which this present invention belongs. In the drawings, parts irrelevant to the description are omitted to clearly describe the present invention.

Hereinafter, a charging device for an electric vehicle according to an embodiment of the present invention will be described in detail with reference to the accompanying drawings.

Figure 2:
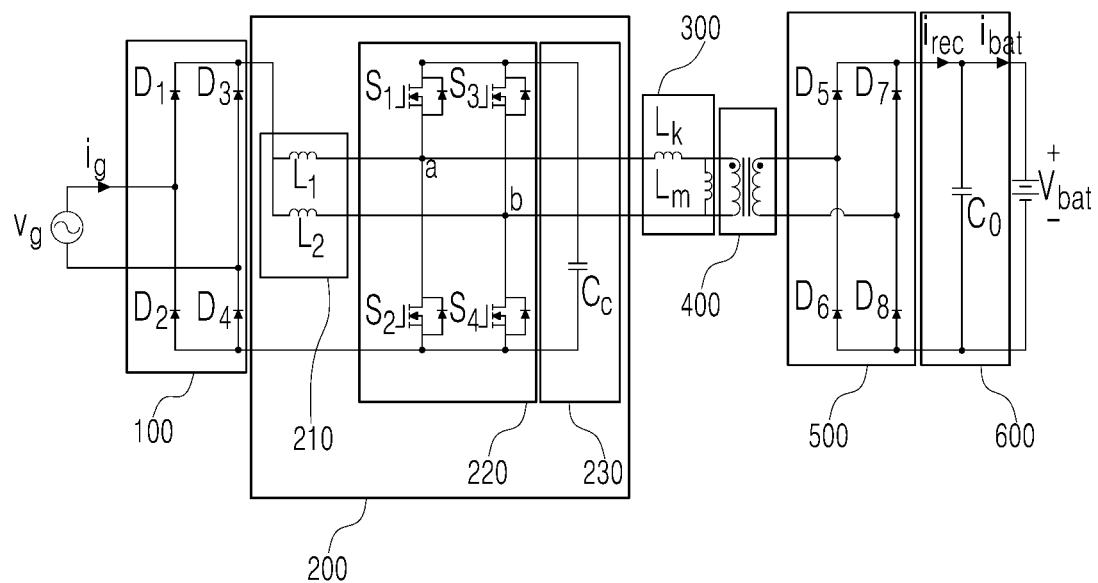
FIG. 2 is a diagram illustrating a detailed configuration of a charging device for an electric vehicle according to an embodiment of the present invention.
Figure 2:
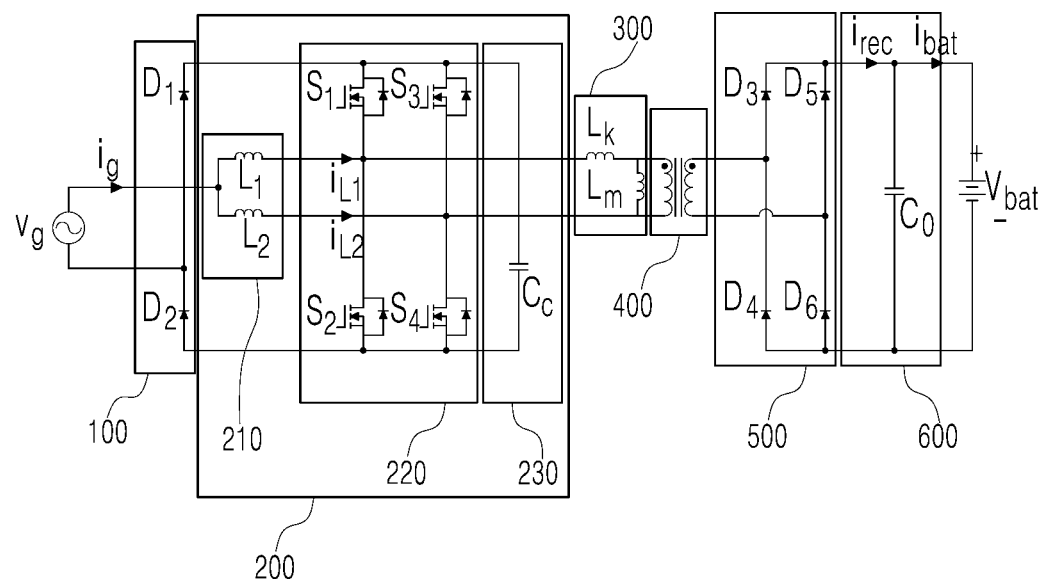
Figure 3:
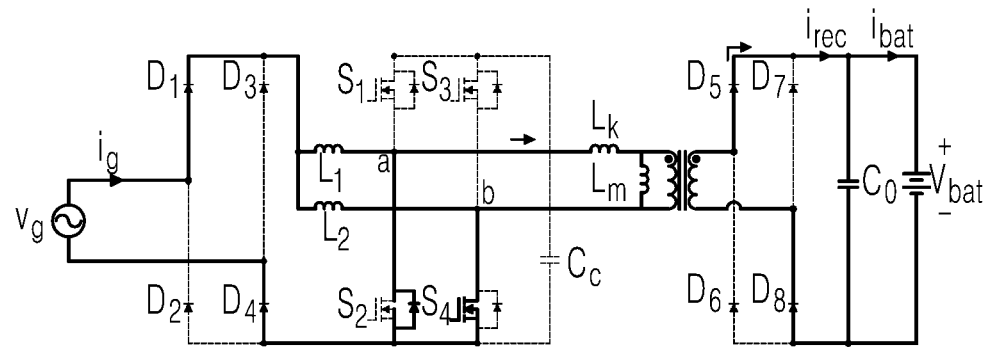
FIGS. 3 to 7 are diagrams illustrating an operation state of a charging device for an electric vehicle according to an embodiment of the present invention.
Figure 7:
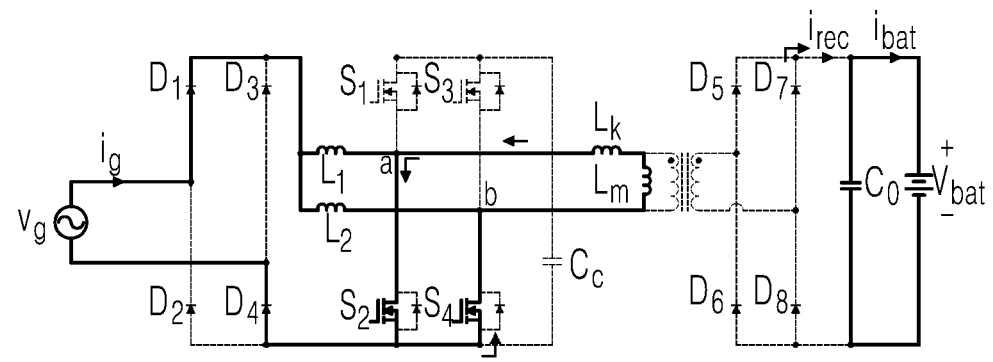
Figure 8:
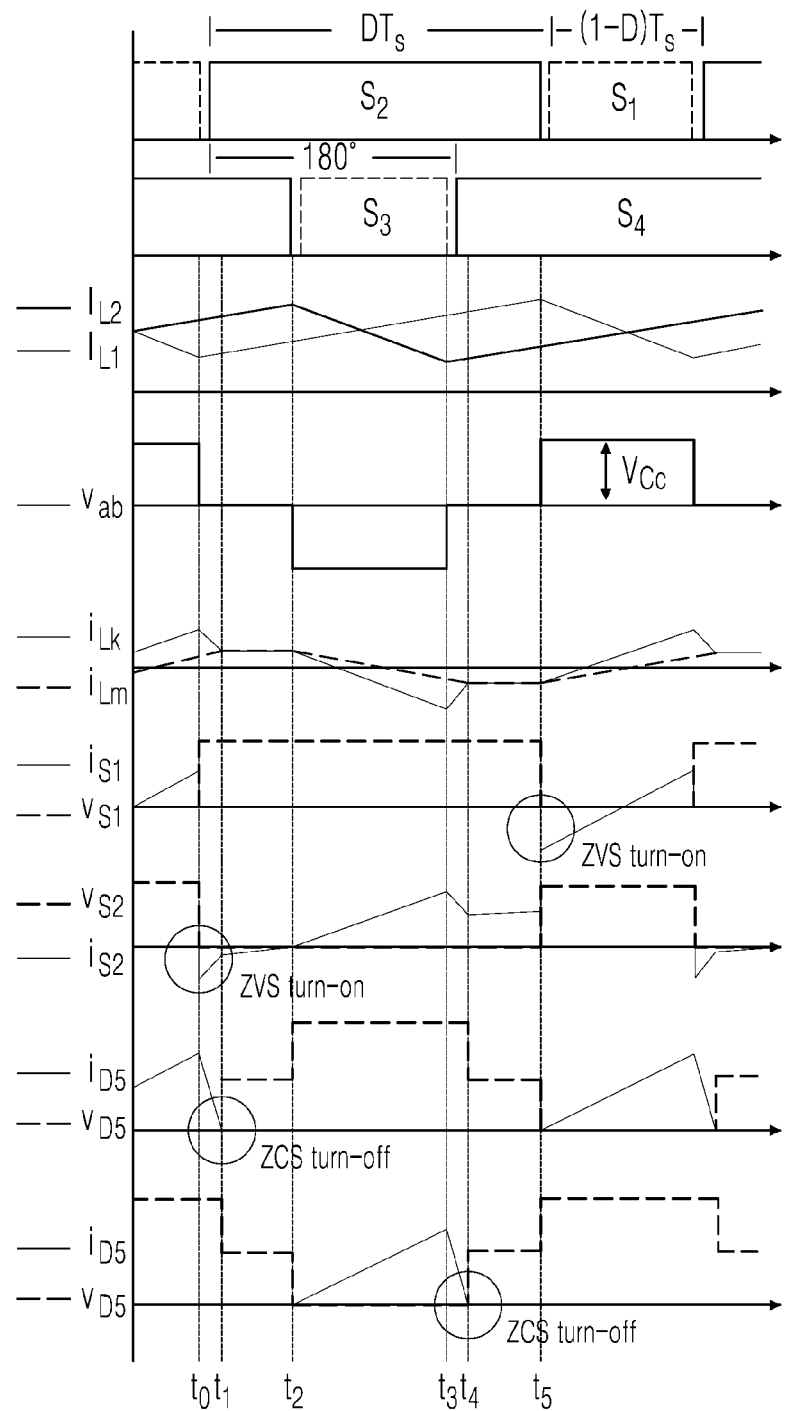
FIG. 8 is a diagram illustrating a waveform output from each unit of a charging device for an electric vehicle according to an embodiment of the present invention.

FIG. 1 is a diagram illustrating a schematic configuration of a charging device for an electric vehicle according to an embodiment of the present invention. FIG. 2 is a diagram illustrating a detailed circuit of each unit shown in FIG. 1. FIGS. 3 to 7 are diagrams illustrating an operation process of a charging device for an electric vehicle shown in FIG. 2. FIG. 8 is a diagram illustrating a waveform output from each unit shown in FIG. 2. The single-stage interleaved soft switching converter shown in FIGS. 1 to 8 is an embodiment for charging a battery in a vehicle with AC power of a system (AC), which only shows only the components related to the embodiment. Therefore, it will be understood by those skilled in the art related to the embodiments that other general-purpose components may be further included in addition to the components shown in FIGS. 1 to 8.

Figure 9:
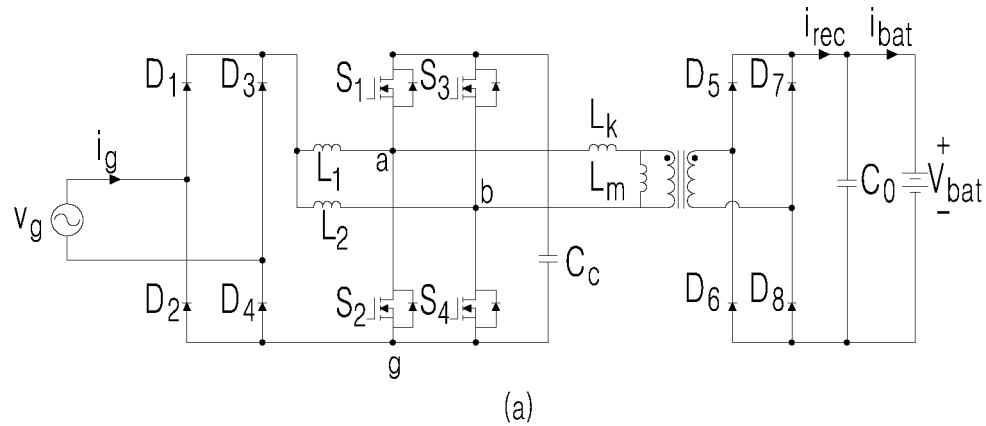
FIGS. 9 to 13 are diagrams illustrating states of expansion into multiple phases of a charging device of an electric vehicle according to an embodiment of the present invention.
Figure 9:
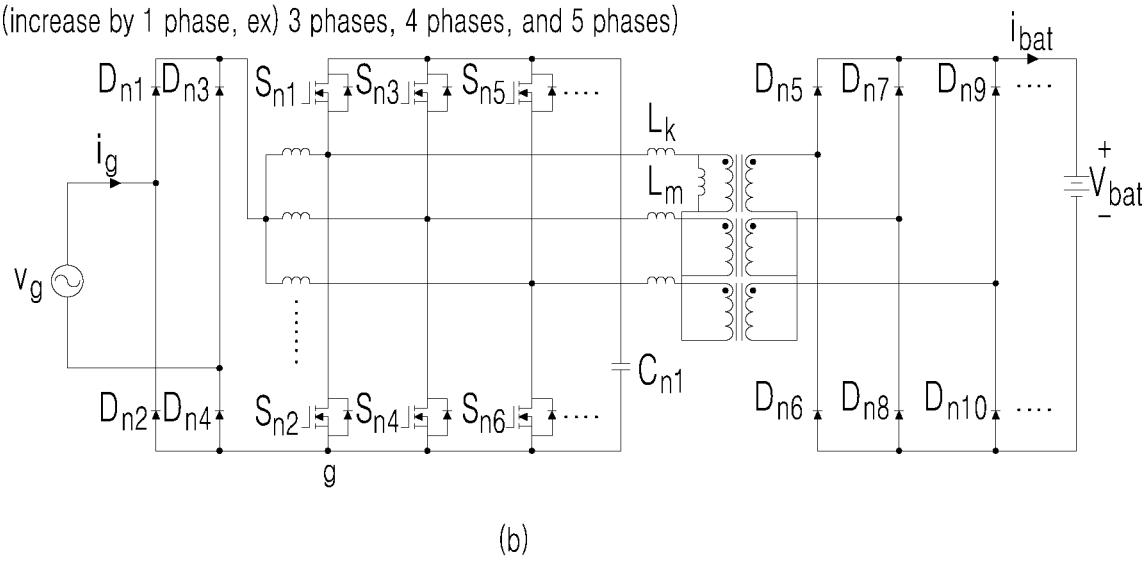
Figure 10:
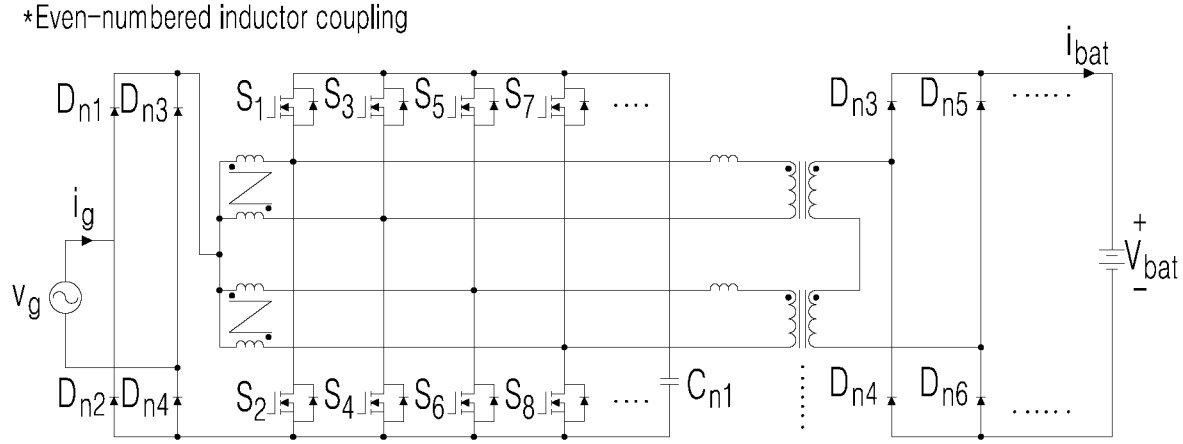
Figure 11:
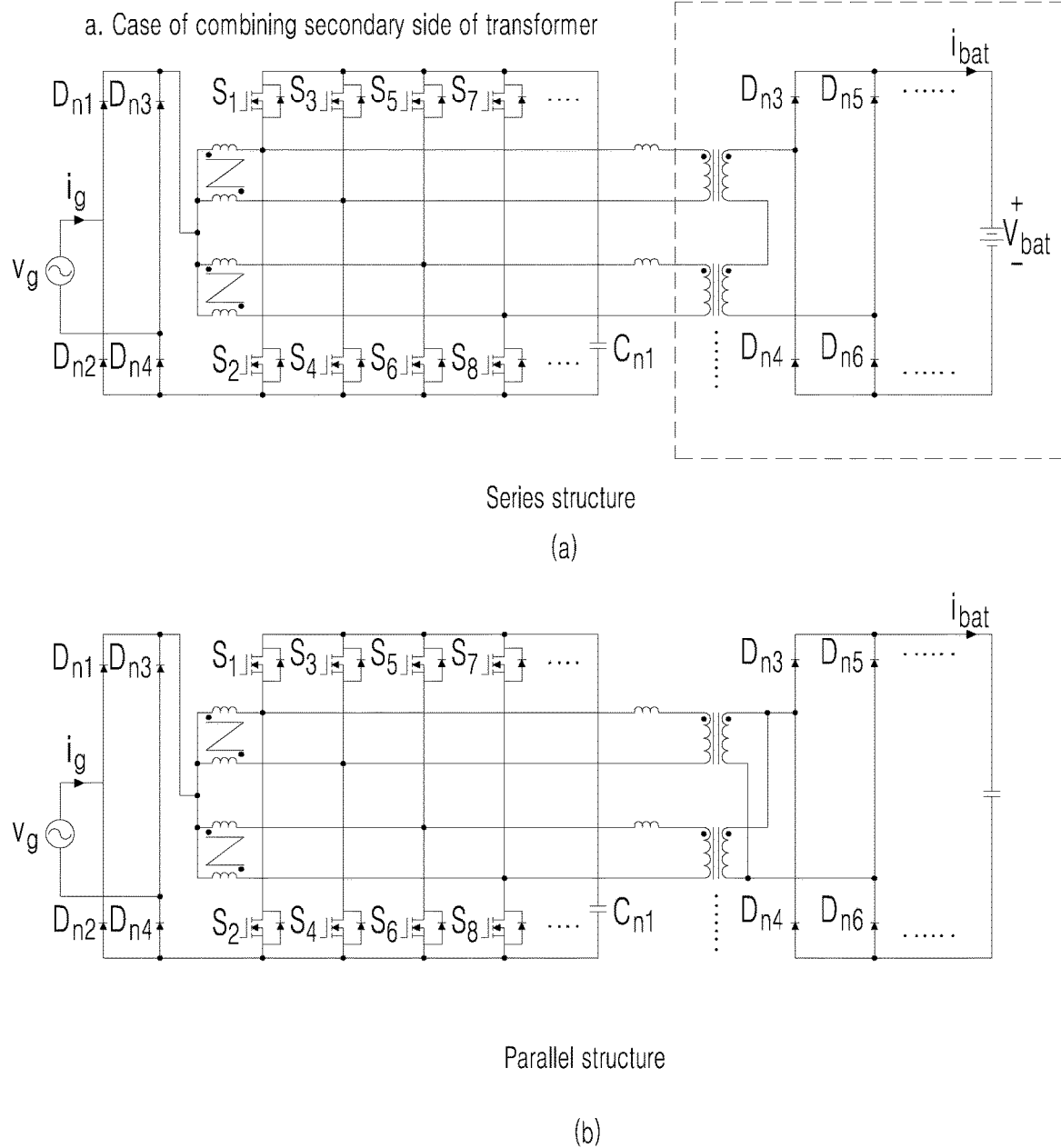
Figure 12:
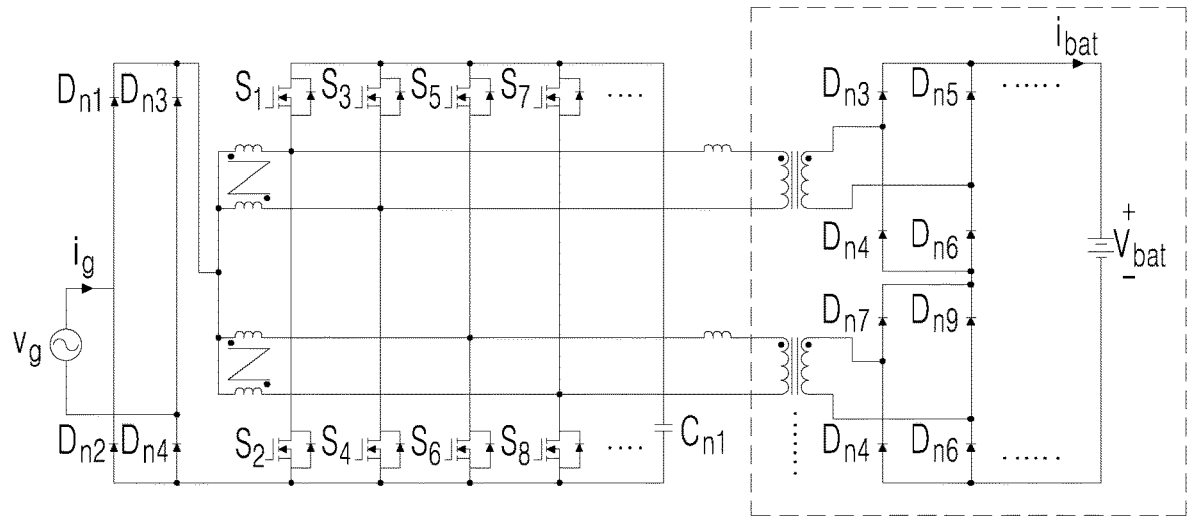
Figure 12:
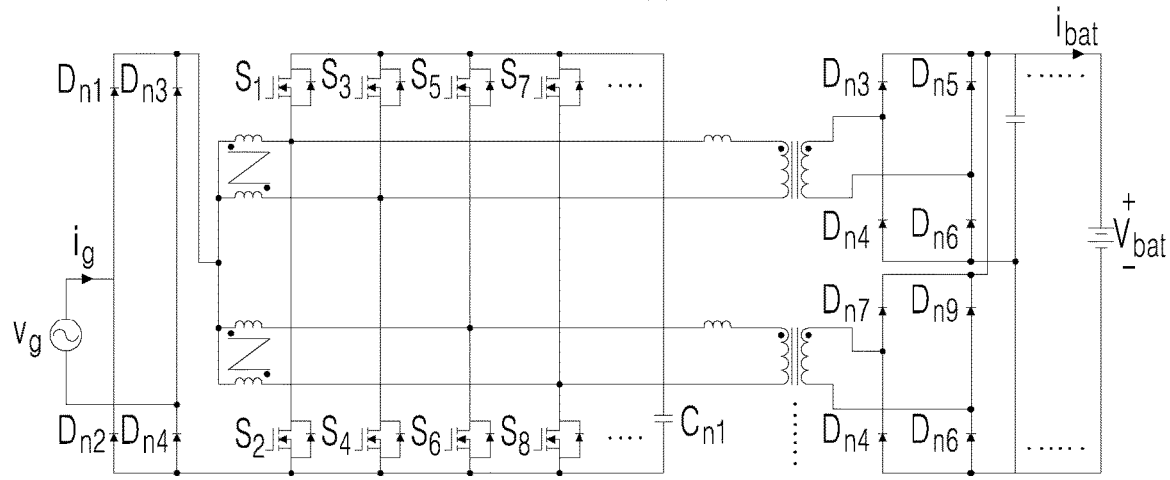
Figure 13:
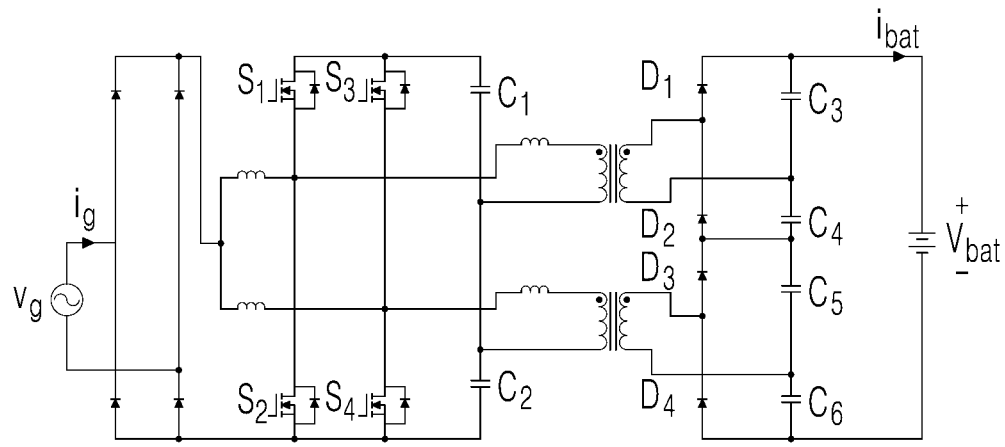
Figure 14:
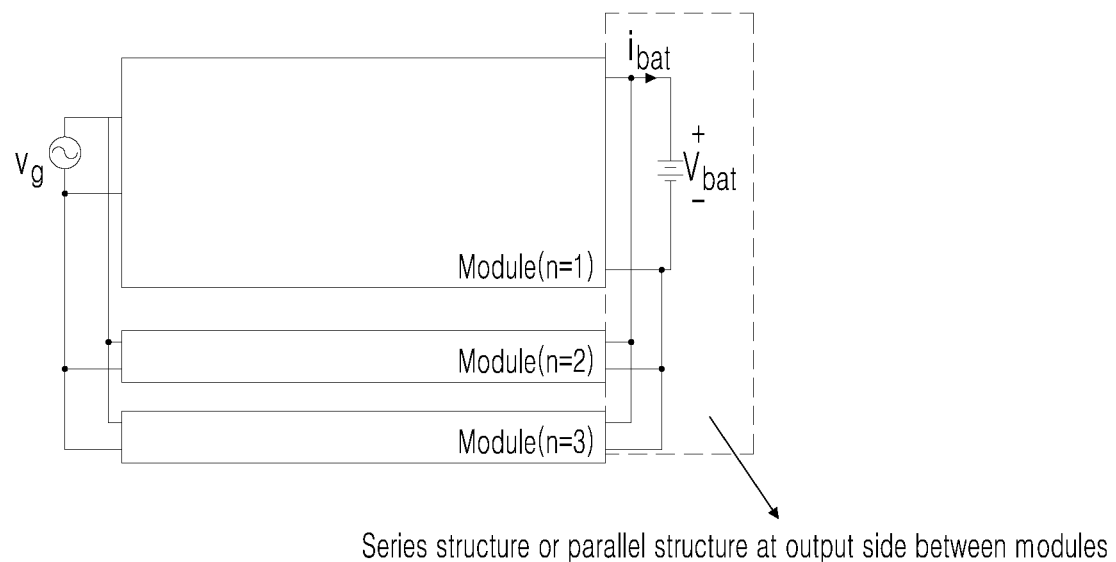
FIGS. 14 and 15 are diagrams illustrating states in which an interleaving PFC circuit of a charging device of an electric vehicle is manufactured as a module according to another embodiment of the present invention.
Figure 15:
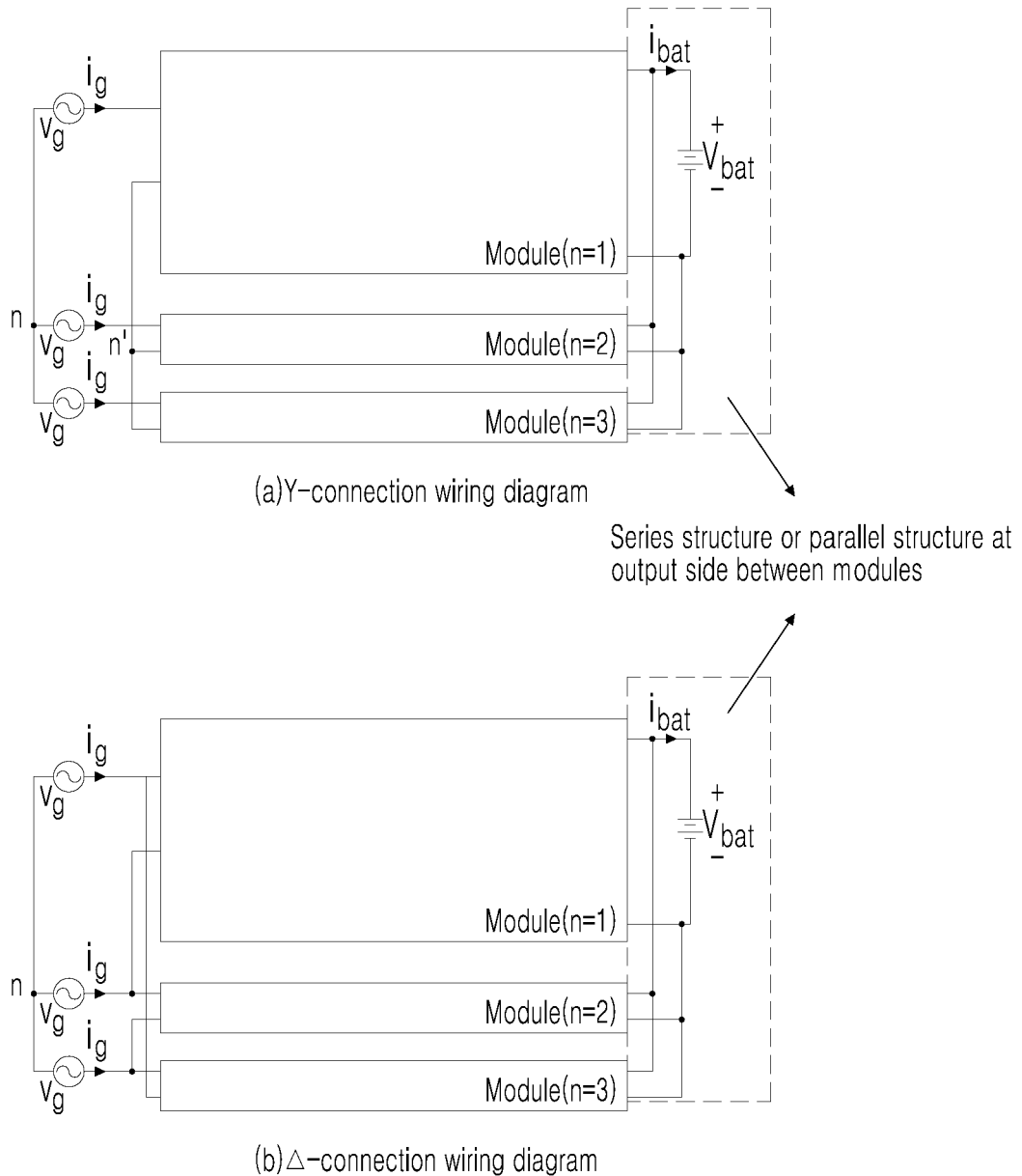

FIG. 1 is a diagram illustrating a schematic configuration of a charging device for an electric vehicle according to an embodiment of the present invention. FIG. 2 is a diagram illustrating a detailed circuit of each unit shown in FIG. 1. FIGS. 3 to 7 are diagrams illustrating an operation process of a charging device for an electric vehicle shown in FIG. 2. FIG. 8 is a diagram illustrating a waveform output from each unit shown in FIG. 2. FIGS. 9 and 10 are diagrams illustrating examples in which a converter of an embodiment of a charging device shown in FIG. 2 is expanded for multiple phases. FIGS. 11 to 13 are diagrams illustrating examples of combination states of elements of a transformer, a shaping unit, and a link unit for an expanded converter shown in FIGS. 9 and 10. FIGS. 14 and 15 are diagrams illustrating examples of states in which an expanded converter shown in FIGS. 9 and 10 is manufactured as one chip in a single module form.

Referring to FIGS. 1 to 15, a charging device for an electric vehicle may include a rectifying unit 100, an interleaving PFC circuit 200, a filter unit 300, a transformer 400, a link unit 500, a shaping unit 600, and a control unit 700.

The rectifying unit 100 may be provided with a full-bridge circuit including diodes D1 to D4 that full-wave rectify input AC power. A series of procedures for full-wave rectifying AC power may be understood by those skilled in the art related to the present invention.

Also, the rectifying unit 100 may be provided with a half-bridge circuit in a totem-pole structure in which diodes D1 and D2 for half-wave rectifying input AC power of a system are included to minimize the number of components. The operation process of the single-stage interleaved soft switching converter in the totem-pole structure is the same as or similar to that of a single-stage interleaved soft switching converter including full-wave rectification to be described later, so a detailed description thereof will be omitted. Here, when the rectifying unit 100 is provided with a full-wave bridge circuit or with a half bridge circuit in a totem-pole structure, the equivalent circuit is the same.

Further, the interleaving PFC circuit 200 includes: a PFC unit 210 having a first coil L1 and a second coil L2 connected in parallel to the output side of the rectifying unit 100 and correcting power factor of the output voltage of the rectifying unit 100; and a switching unit 220 including first and fourth switching elements S1 and S4 provided to the first coil L1 in parallel and operate in a complementary manner, and including second and third switching elements S2 and S3 provided to the output side of the second coil L1 in parallel and operate in a complementary manner.

Here, the first switching element S1 and the second switching element S2 may be composed of FETs and diodes having the same polarity, and the third switching element S3 and the fourth switching element S4 may be composed of FETs and diodes having the same polarity which is opposite to that of the first switching element S1 and the second switching element S2. Accordingly, on the basis of a switching signal of the control unit 600, the first switching element S1 and the fourth switching element S4 operate in a complementary manner, and the second switching element S1 and the third switching element S3 operate in a complementary manner, thereby minimizing the switching loss.

Further, the interleaving PFC circuit 200 may further include a clamping unit 230 having a clamping capacitor Cc between the second switching element S2 and the third switching element of the switching unit 220. Here, the clamping capacitor Cc may be provided in a film form.

According to the switching operation of the first switching element S1 to the fourth switching element S4, the power factor and output voltage and current of the battery may be controlled in a single-stage method, and the clamping capacitor Cc in film type instead of electrolytic type is used, thereby enhancing power density and durability.

Further, the filter unit 300 that is connected in series to the output sides of the first coil L1 and the second coil L2 therebetween and is configured to remove a pre-determined frequency (usually 120 Hz) component of the output voltage of the interleaving PFC circuit 100, is connected to the output side of the interleaving PFC circuit 200. This filter unit 300 includes a first coil Lk and a fourth coil Lm connected in series between output sides of the first coil L1 and the second coil L2.

The transformer 400 that increases the output voltage of the filter unit 300 according to the turns ratio is connected between the input side and the output side of the fourth coil Lm of the filter unit 300. Here, it will be understood by those skilled in the art related to the present invention that the transformer 400 increases the output voltage of the filter unit 300 according to the turns ratio for provision.

In the meantime, the output side of the transformer 400 may be connected to the shaping unit 500. The link unit 500 includes fifth to eighth diodes D5 to D8 and a link capacitor Co and performs an operation of providing the increased output voltage of the transformer 400 to a battery Vbat.

That is, regarding the shaping unit 500, the fifth diode D5 and the seventh diode D7 connected to a first output side and a second output side of a secondary side coil of the transformer 400, respectively, access the input side of the battery Vbat. The sixth diode D6 and the eighth diode D8 are connected between the output side of the battery Vbat and the first output side and the second output side of the secondary side coil of the transformer 400.

Further, the link unit 600 includes the capacitor Co between the output side of the fifth diode D5 and the seventh diode D7 and the input side of the sixth diode D6 and the eighth diode D8, wherein the capacitor Co links the output voltage of the fifth diode D5 to of the eighth diode D8, to the battery Vbat.

Further, the fifth diode D5 to the eighth diode D8 receiving the output voltage at the secondary side of the transformer 400 are switched in a complementary manner so that providing the output voltage at the secondary side of the transformer 400 to the battery Vbat is controlled.

Hereinafter, a series of procedures for charging the battery Vbat with the input AC power (AC) will be described with reference to FIGS. 3 to 8.

First, mode 1 in which AC power (AC) input from outside is supplied to the battery Vbat in the form of DC output voltage will be described with reference to FIGS. 3 to 8.

In section t0-t1 of FIG. 8, positive AC power (AC) is provided to the switching unit 220 of the interleaving PFC circuit 200 by passing via the first diode D1 of the rectifying unit 100, the first coil L1 of the interleaving PFC circuit 200, and the third coil Lk and the fourth coil Lm of the filter unit 300 in sequence.

Here, referring to FIG. 8, the second switching element S2 of the switching unit 220 is switched into an on state on the basis of the switching signal of the control unit 700.

Further, the output voltage of the filter unit 300 passes via the second switching element S2 and is provided to a negative terminal of an AC power supply (AC) through the fourth diode D4 of the rectifying unit 100. Here, the current flowing in the third coil Lk and the fourth coil Lm of the filter unit 300 is provided to the primary side of the transformer 400, and the output current increased by the transformer 400 passes via the fifth diode D5 of the shaping unit 500 and charges the battery Vbat through the link capacitor Co.

That is, regarding AC power (AC), the power factor is improved by the first coil L1 and the second coil L2, and soft switching by the switching element S2 is possible.

Referring to FIG. 8, in section t0-t1 of mode 1, the current iLk flowing in the fourth coil Lk decreases at a pre-determined slope. At this time, the difference between the current iLk flowing in the fourth coil Lk and the current flowing in the first coil L1 is supplied to the first switching element S1, and it is found that the switching unit 220 (ZVC) is switched into a turn-on state and the link unit 600 (ZCS) is turned off.

Figure 4:
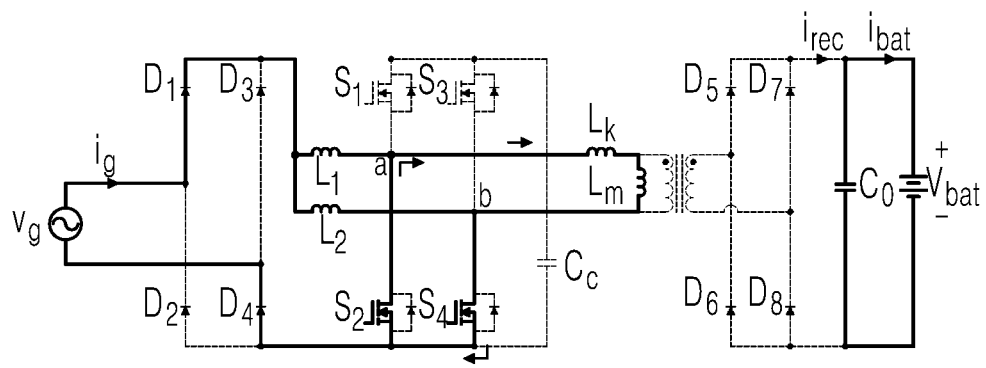

An operation process in mode 2 in which charging of the battery Vbat is completed by discharge of the capacitor Co of the link unit 600 in section t1-t2 of FIG. 8 will be described with reference to FIG. 4.

When charging of the battery Vbat with the output voltage linked by the capacitor Co of the link unit 600 is completed, the DC output voltage that has passed through the fifth diode D5 of the link unit 600 is zero.

The output voltage of the transformer 400 is blocked by the link unit 600 and is prevented from being provided to the battery Vbat. Afterward, positive AC power (AC) changes into negative AC power.

Further, in section t1-t2 of FIG. 8, it is found that the current flowing in the fourth coil Lk and the fourth coil Lm is constant and the second switching element S2 is turned off by the control unit 600.

Figure 5:
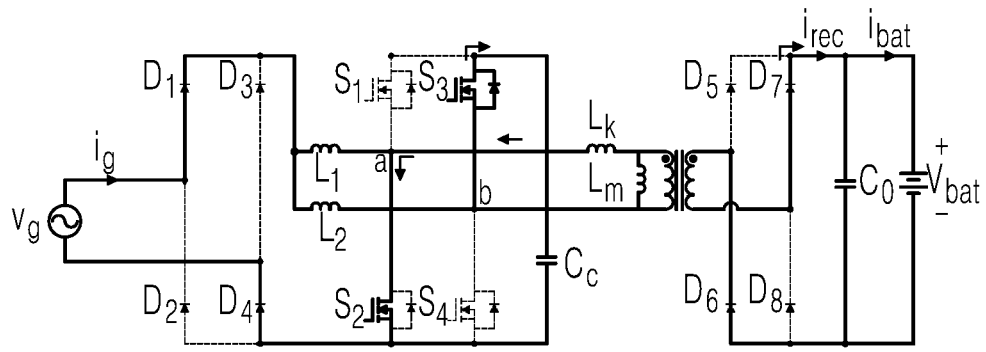

Mode 3 in which the battery Vbat is charged in section t2-t3 of FIG. 8 will be described with reference to FIG. 5.

AC power (AC) is provided to the switching unit 220 by passing via the first diode D1 of the rectifying unit 100 and the first coil L1 of the PFC unit 210, and is provided to the negative terminal of the AC power supply (AC) by passing via the first switching element S1 switched into the on state by the switching signal of the control unit 700 and via the fourth diode D4 of the rectifying unit 100.

In the meantime, the negative voltage (−) of the battery Vbat passes via the sixth diode D6 of the link unit 400 and passes via the seventh diode D7 through the secondary side of the transformer 400 to be linked to the capacitor Co, and the link voltage of the capacitor Co is supplied to the positive terminal (+) of the battery Vbat.

Further, the output voltage at the primary side excited by the current flowing to the secondary side of the transformer 400 is provided to the first switching element S1 of the switching unit 220 by passing via the third coil Lk of the filter unit 300.

By passing via the first switching element S1 switched into the turn-on state by the switching signal of the control unit 700 and via the fourth diode D4, the supply to the negative terminal of the AC power supply (AC) is performed.

Further, the output current of the second coil L2 of the PFC unit 220 charges the capacitor Cc of the clamping unit 230 by passing via the third switching element S3 of the switching unit 220 switched into the turn-on state by the switching signal of the control unit 600.

Further, in section t2-t3 of FIG. 8, when the second switching element S2 is turned off and the current of the third coil Lk is constant, it is found that the current of the third coil Lk decreases and the current of the fourth coil Lm constantly decreases by the voltage supplied to the battery Vbat and the third switching element S3 is turned off.

Figure 6:
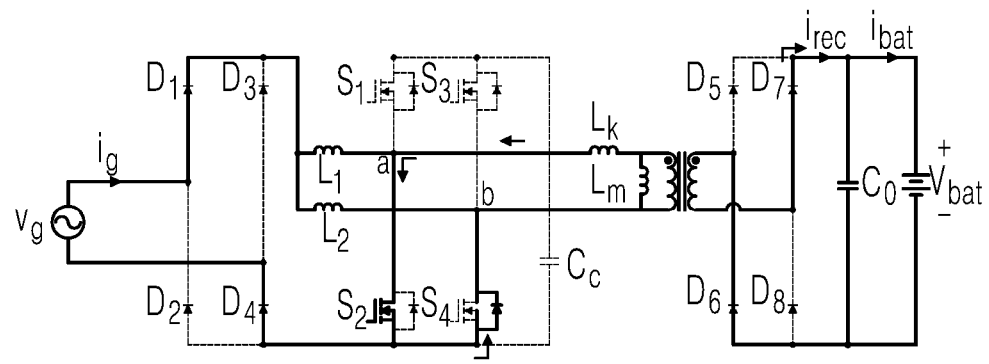

Afterward, in section t3-t4 of FIG. 8, when the third coil Lk and the fourth coil Lm of the filter unit 300 have the same amount of current flowing therein, FIGS. 6 and 8 are referenced.

That is, when the current flowing in the third coil Lk of the filter unit 300 becomes equal to the current flowing in the fourth coil Lm in section t3-t4 of FIG. 8, AC power (AC) passes via the first diode D1 of the rectifying unit 100 and is supplied to the third coil Lk of the filter unit 300 through the first coil L1 of the PFC unit 210. The output voltage of the rectifying unit 100 which has passed through the first diode D1 is supplied to the fourth coil Lm of the filter unit 300 through the second coil L2 of the PFC unit 210.

Here, the negative voltage (−) of the battery Vbat passes via the sixth diode D6 of the link unit 600 and passes via the seventh diode D7 through the secondary side of the transformer 400 to be linked to the capacitor Co, and the link voltage of the capacitor Co is provided to the positive terminal (+) of the battery Vbat.

Further, the output voltage at the primary side excited by the current flowing to the primary side of the transformer 400 is provided to the first switching element S1 of the switching unit 220 by passing via the third coil Lk of the filter unit 300.

That is, the current supplied to the first switching element S1 is the sum of the current excited by the third coil Lk and the fourth coil Lm of the filter unit 300 and the current of the first coil L1.

In the meantime, the current passing through the second coil L2 and flowing to the fourth coil Lm is supplied to the second switching element S2.

Further, the output current of the PFC unit 210 which has passed through the first switching element S1 and the second switching element S2 that are switched into the turn-on state by the switching signal of the control unit 700 is provided to the negative terminal of the AC power supply by passing via the fourth diode D4.

Further, in section t3-t4 of FIG. 8, the output voltage of the first diode D1 is provided to the third coil Lk, so that the current iLk flowing in the third coil decreases and becomes equal to the current iLm flowing in the fourth coil.

Afterward, a series of procedures in which charging of the battery Vbat is stopped when the current flowing in the third coil Lk of the filter unit 300 becomes equal to the current flowing in the fourth coil Lm in section t4-t5 of FIG. 8 will be described with reference to FIG. 7.

That is, when the current flowing in the third coil Lk of the filter unit 300 becomes equal to the current flowing in the fourth coil Lm, the current flowing at the primary side of the transformer 400 reaches zero, so charging of the battery Vbat is performed by the capacitor Co of the link unit 600.

Here, the output voltage at the primary side excited by the current flowing to the primary side of the transformer 400 is provided to the first switching element S1 of the switching unit 220 by passing via the third coil Lk of the filter unit 300.

Further, the output voltage supplied to the first switching element S1 is the sum of the voltage supplied via the diode D1 and the voltage that has passed through the third coil Lk of the filter unit 300. In the meantime, the current passing through the second coil L2 and flowing to the fourth coil Lm is supplied to the second switching element S2.

Further, the output current of the PFC unit 210 which has passed through the first switching element S1 and the second switching element S2 that are switched into the turn-on state by the switching signal of the control unit 700 is provided to the negative terminal of the AC power supply by passing via the fourth diode D4.

In section t4-t5 of FIG. 8, it is found that the third coil Lk and the fourth coil Lm have the same amount of current flowing therein and the first switching element S1 is turned off. Afterward, repeated operation is performed by the cycle of AC power. Here, with respect to the single-stage interleaved soft switching AC-DC converter, a series of procedures in which the control unit 800 generates a switching signal for controlling the switching elements of the switching unit 120 and the shaping unit 600 will be understood by those skilled in the art related to the embodiment of the present invention.

In the embodiment of the present invention, for convenience of description, a single-phase charging device is described as an example. However, as shown in FIGS. 9 and 10, it is possible that a charging device with three phases having the phase difference of 120 degrees or more phases is implemented as a charging device for an electric vehicle using an interleaved PFC method in a single input structure.

There are included: at least one interleaving PFC circuit that has multiple switching units accessing output sides of respective PFC units and has a clamping unit provided between the output side of the first phase switching unit and the output side of the last phase switching unit among the output sides of the multiple switching units; a rectifying unit and a clamping unit accessing output sides of each interleaving PFC circuit, respectively; at least one filter unit connected to the output side of each interleaving PFC circuit; and at least one transformer accessing the output side of each filter unit.

Here, when using at least one interleaving PFC circuit provided as one module, the charging device of the electric vehicle may be increased in phase by one phase (three phases, four phases, and the like) of a single input as shown in FIG. 9, or may be increased in phase by two phases (four phases, six phases, and the like) for a single input as shown in FIG. 10.

That is, as shown in FIGS. 9 and 10, in the single-stage interleaved soft switching AC-DC converter, the number of coils of the PFC unit 210, the number of switching elements of the switching unit 220, the number of transformers, and the number of diodes of the shaping unit are set on the basis of the output phase to be expanded.

Further, as shown in FIG. 10, when the number of expanded phases is the even number (two phases, four phases, and the like), a coupler coupling a first coil and a second coil of the PFC unit is further included. As shown in FIG. 11, each transformer for each phase may be provided with series connection in which at the secondary side, one end of a first winding coil is connected to one end of a second winding coil, or may be provided with parallel connection in which at the secondary side, one end of the first winding coil is connected to one end of the second winding coil and at the secondary side, the other end of the first winding coil is connected to the other end of the second winding coil.

Further, as shown in FIG. 12, the shaping unit each phase may be provided in such a manner as to be combined in series or in parallel between the transformer for each phase and the battery.

As shown in FIG. 13, the link unit for each phase may be provided with capacitors combined in series or in parallel with respect to each phase. Further, the present invention has expandability for multiple phases with respect to the single-stage interleaving PFC circuit having the switching unit in the totem-pole structure and is capable of performing high-power charging.

In the meantime, as shown in FIGS. 14 and 15, the single-stage interleaved soft switching AC-DC converter may be provided with a plurality of single-phase input modules. The single-phase input modules may be provided in one of the serial form and the parallel form. Alternatively, a multi-phase input module may be provided. The multi-phase input modules may be provided in series or in parallel. Further, with respect to the single-stage interleaved soft switching AC-DC converter according to the embodiment of the present invention, manufacture as a module in the form of a single chip is possible.

Figure 16:
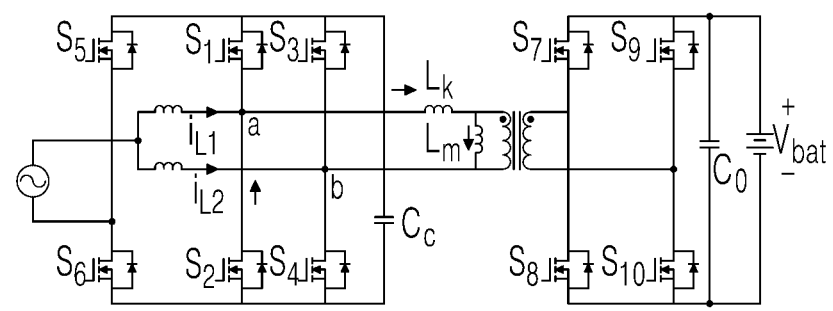
FIG. 16 is a circuit diagram illustrating an interleaved DC-AC converter of a charging device of an electric vehicle according to still another embodiment of the present invention.

In the meantime, FIG. 16 is a circuit diagram illustrating a bidirectional converter of the single-stage interleaved soft switching converter in the totem-pole structure shown in FIG. 2(b). As shown in FIG. 16, the single-stage interleaved soft switching converter in the totem-pole structure may be configured in such a manner as to store the DC link voltage in the battery using AC power of the system (AC) as input and to enable bidirectional converting wherein the charging voltage of the battery Vbat is provided to the input terminal of the AC power supply of the system (AC).

Further, in the single-stage interleaved soft switching converter in the totem-pole structure of the present invention, as shown in FIG. 16, the first and the second diodes D1 and D2 of the rectifying unit 100 shown in FIG. 2(b) may be provided as FET switching elements S5 and S6, and the fifth to the eighth diodes D5 to D8 of the shaping unit 600 may be provided as FET switching elements S7 to S10.

Figure 17:
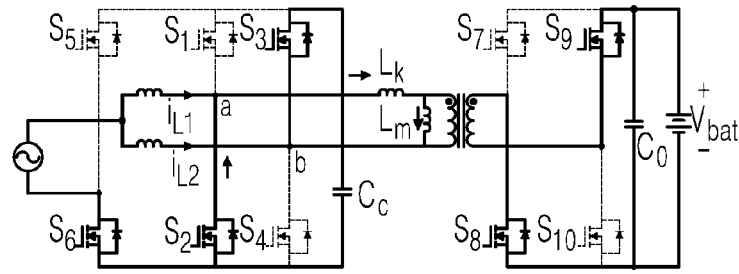
FIG. 17 is a circuit diagram illustrating an operation state for each mode of an interleaved DC-AC converter of a charging device of an electric vehicle according to still another embodiment of the present invention.
Figure 17:
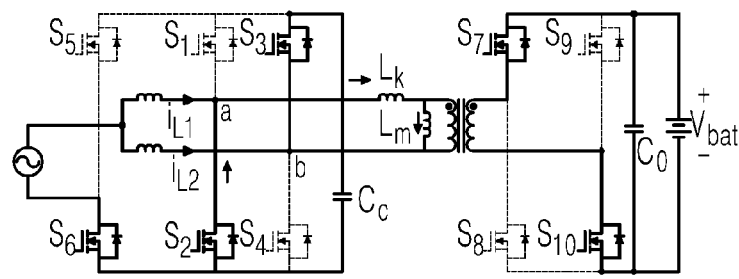
Figure 17:
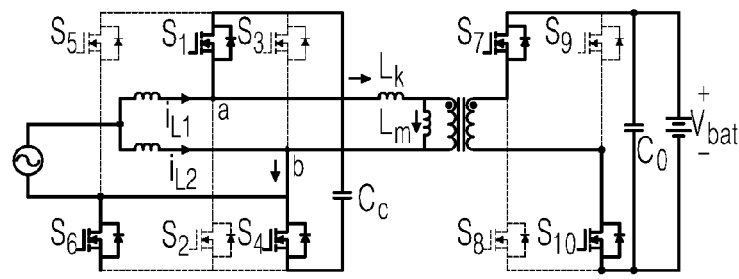
Figure 17:
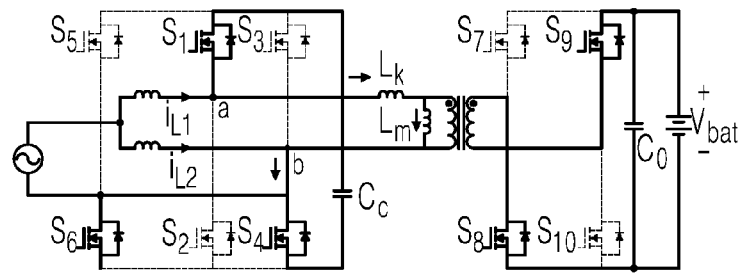
Figure 18:
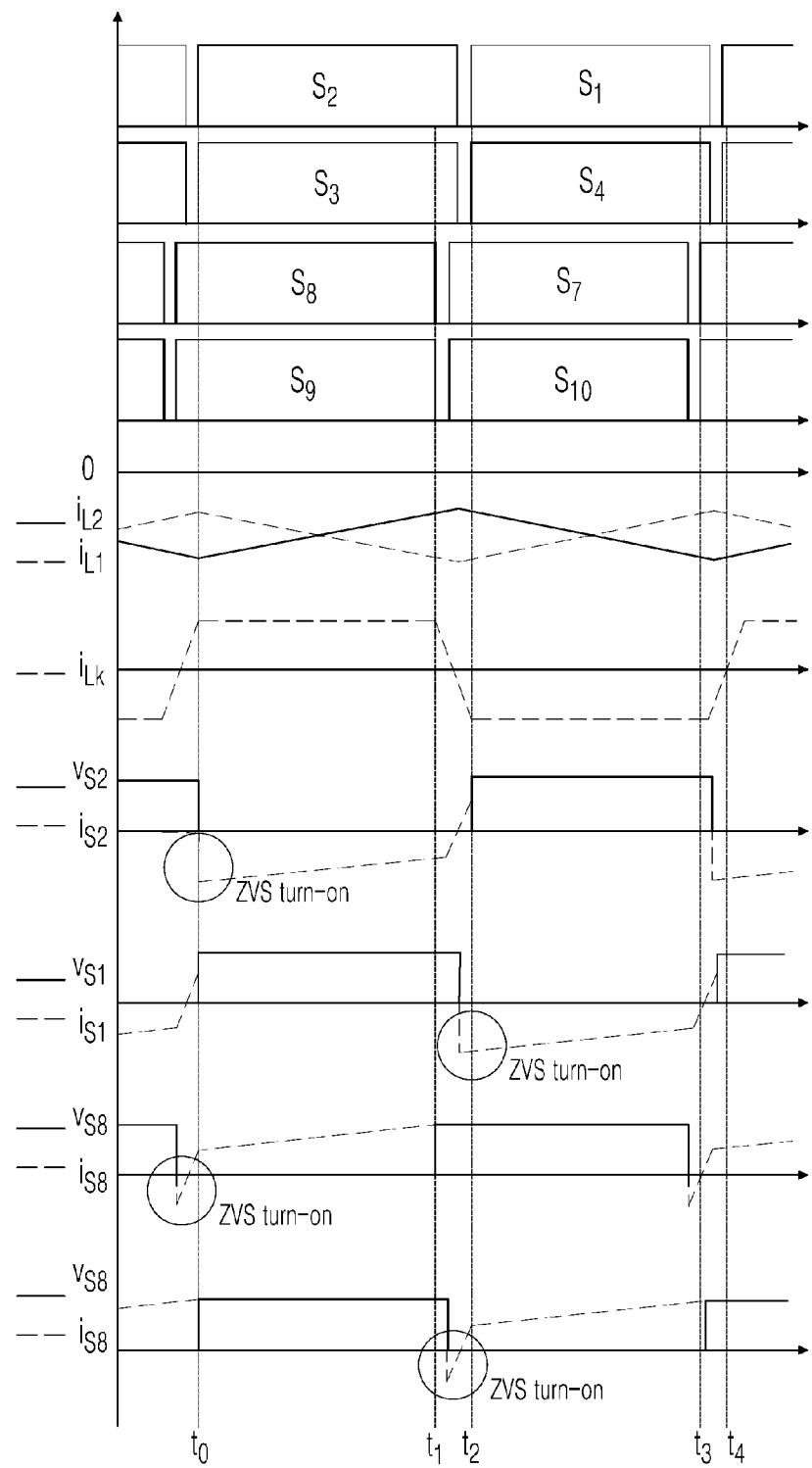
FIG. 18 is a waveform diagram illustrating an output signal from each unit of an interleaved DC-AC converter of a charging device of an electric vehicle according to according to still another embodiment of the present invention.

FIG. 17 is a diagram illustrating DC-AC converting of the single-stage interleaved soft switching converter shown in FIG. 16. FIG. 18 is a diagram illustrating a waveform output from each unit of the single-stage interleaved soft switching converter shown in FIG. 17.

First, the operation process of the AC-DC converter that converts AC power (AC) into the DC form and charges the battery is the same as or similar to that described above with reference to FIGS. 2 to 8.

Hereinafter, an operation process of a DC-AC converter that converts battery charging power from the DC form into the AC form and provides the resulting power to the system (AC) will be described with reference to FIGS. 17 and 18.

In section t0-t1 of mode 1, battery charging power Vbat is provided to the link unit 600 by passing via the link capacitor Co of the link unit 600, the FET switching element S8 of the shaping unit 600, and the FET switching element S9 of the transformer 400 in sequence. An excitation signal of the transformer 400 is provided to the first coil L1 of the interleaving PFC circuit 200 by passing via the third switching element S3 of the switching unit 220 of the interleaving PFC circuit 200, the capacitor Cc of the clamping unit 230, and the second switching element S2 of the switching unit 220 of the interleaving PFC circuit 200 in sequence. Thus, the output signal of the transformer 400 is provided to the system AC by passing through the first coil L1.

The output signal of the system (AC) passes through the FET switching element S6 of the rectifying unit 100 and is provided to the capacitor Cc of the clamping unit 230.

Accordingly, referring to FIG. 18, in section t0-t1 of mode 1, it is found that the second switching element S2 and the third switching element S3 of the switching unit 220 are switched into the turn-on state and the link unit 600 is switched in to the turn-on state. It is found that the current iL1 flowing in the first coil L1 is increased at a constant slope; the current iL2 flowing in the second coil L2 is decreased at a constant slope; and both have negative values. Here, it is found that the current iLk flowing in the third coil Lk of the filter unit 300 has a constant value.

Afterward, the output signal of the third coil Lk of the filter unit 300 is provided to the transformer 400, the output signal of the transformer 400 is provided to the link unit 600 on the basis of the FET switching elements S7 and S10 of the shaping unit 600, and the linked DC power of the link unit 500 is provided to the battery Vbat. Further, in section t1-t2 of mode 2, it is found that the leakage current of the third coil L3 is rapidly decreased and the link unit 600 (ZCS) is turned on.

When the leakage current of the third coil L3 of the filter unit 300 is decreased to a pre-determined threshold or below, it is found that in section t2-t3 of mode 3, the first switching element S1 and the fourth switching element S4 of the switching unit 220 are switched into the turn-on state.

Further, the output signal of the fourth coil L4 of the filter unit 300 passes via the fourth switching element S4 of the switching unit 220, the clamping unit 230, and the first switching element S1 of the switching unit 220 in sequence, and is provided to the system (AC) by passing via the first coil L1 of the interleaving PFC circuit 200. The output signal of the system (AC) is provided to the capacitor Cc of the clamping unit 230 by passing via the FET switching element S6 of the rectifying unit 100. Accordingly, in section t2-t3 of mode 3, it is found that the leakage current Lk of the filter unit 300 is maintained constantly.

Afterward, in section t3-t4 of mode 4, the link unit 600 (ZVS) is switched into the turn-on state, so that the link signal of the link unit 600 is provided to the system side through the transformer 400. The excitation voltage of the transformer 400 is provided to the system (AC) by passing via the fourth switching element S4 of the switching unit 220, the capacitor Cc of the clamping unit 230, the switching element S1, and the first coil L1.

Further, the output signal of the system (AC) is provided to the clamping unit 230 by passing via the FET switching element S6 of the rectifying unit 100. Accordingly, DC power of the battery Vbat is converted into AC power by the interleaving PFC circuit 200, and the resulting power is provided to the system (AC).

According to the present invention, an interleaving PFC circuit is formed with respect to a single input power supply of a charging device for an electric vehicle so that power factor is controlled and battery charging and current are integrally controlled, whereby it is possible to enhance efficiency of the charging device and to reduce the cost. Also, it is possible to remove harmful electromagnetic radiation. It is possible to enhance power density and durability by using a film-type capacitor instead of the conventional electrolytic capacitor. It is possible to reduce switching loss by soft switching operation and to reduce the volume of the filter unit.

Also, according to the present invention, it is possible to design magnetizing current to be small by removing a low-frequency component of the transformer, to reduce the volume, and to perform high-power charging according to the number of windings of the transformer.

Also, a dual-structure converter having the conventional PFC stage for converting input AC power into DC power and the insulation stage for charging the battery with DC power obtained by converting AC power passed through the PFC state is designed into a single stage, and the full-wave bridge circuit of the rectifying unit is designed into the half bridge circuit and the switching unit is designed into the totem-pole structure, whereby it is possible to minimize the number of components of the charging device; have expandability for multiple phases; and enable manufacture into one chip in a single module form so that reduction in weight, thickness, length, and size is possible.

According to the present invention, in the single-stage interleaving PFC circuit having the switching unit in the totem-pole structure, diodes of the rectifying unit and of the shaping unit are provided as FET switching elements so that it is possible to charge the battery in the system and to perform bidirectional converting in which battery charging voltage is provided to the system.

INDUSTRIAL APPLICABILITY

An interleaving PFC circuit is formed with respect to a single input power supply of a charging device for an electric vehicle so that power factor is controlled and battery charging and current are integrally controlled, whereby it is possible to enhance efficiency of the charging device and to reduce the cost; remove harmful electromagnetic radiation; enhance power density and durability by using a film-type capacitor instead of the conventional electrolytic capacitor; reduce switching loss by soft switching operation and to reduce the volume of the filter unit; design magnetizing current to be small by removing a low-frequency component of the transformer to reduce the volume; and perform high-power charging according to the number of windings of the transformer. A dual-structure converter having the conventional PFC stage and the insulation stage for charging the battery with DC power obtained by converting AC power passed through the PFC stage is designed into a single stage, and a full-wave bridge circuit of the rectifying unit is designed into a half bridge circuit and the switching unit is designed into a totem-pole structure, whereby it is possible to minimize the number of components of the charging device; have expandability for multiple phases; enable manufacture into one chip in a single module form so that reduction in weight, thickness, length, and size is possible. In the single-stage interleaving PFC circuit having the switching unit in the totem-pole structure, diodes of the rectifying unit and of the shaping unit are provided as FET switching elements so that it is possible to charge the battery in the system and to perform bidirectional converting in which battery charging voltage is provided to the system. Accordingly, it is possible to make significant progress in terms of accuracy and reliability of operation of the single-stage interleaved software switching converter and as well as performance efficiency. The charging device not only has sufficient possibility of commercialization or sales but also be clearly implemented in practice. Therefore, the present invention is industrially applicable.

What is claimed is:

1. A single-stage interleaved soft switching converter comprising:
    a rectifying unit converting input AC power of a system into DC power;
    an interleaving power factor correction (PFC) circuit provided to an output side of the rectifying unit, to control power factor and battery charging and current by single-stage soft switching;
    a filter unit having a third coil and a fourth coil, provided to an output side of the interleaving PFC circuit in parallel, to remove a pre-determined frequency component;
    a transformer provided between an input side and an output side of the fourth coil of the filter unit, to increase an output voltage of the filter unit according to a turns ratio thereof;
    a shaping unit provided to an output side of the transformer to shape increased AC output power of the transformer;
    a link unit outputting a DC link voltage and providing the output link voltage to a battery by charging and discharging output power of the shaping unit through a capacitor; and
    a control unit generating and providing a switching signal for controlling switching elements of the interleaving PFC circuit, thereby controlling output voltage and current of the battery;
    wherein the shaping unit includes a fifth diode and a seventh diode that are connected to one end and another end of a secondary side winding coil of the transformer, respectively, and connected to one end of the battery, and a sixth diode and an eighth diode that are connected to another end of the battery and connected to the one end and the other end of the secondary side winding coil of the transformer, respectively, so as to shape an increased output voltage of the transformer for provision to the link unit.

2. The converter of claim 1, wherein the rectifying unit is provided with one among a full-wave bridge circuit including first to fourth diodes and a half bridge circuit in a totem-pole structure including first and second diodes.

3. The converter of claim 2, wherein the interleaving PFC circuit comprises:
a PFC unit having a first coil and a second coil, provided to the output side of the rectifying unit in parallel to correct power factor of an output voltage of the rectifying unit;
a switching unit including: first and fourth switching elements connected to the first coil and the second coil, respectively, and operating in a complementary manner, and second and third switching elements connected to the first coil and the second coil, respectively, and operating in a complementary manner; and
a clamping unit having a capacitor between the second switching element and the third switching element for clamping thereof.

4. The converter of claim 3, wherein the first switching element and the third switching element are composed of FETs and diodes having a same polarity,
the second switching element and the fourth switching element are composed of FETs and diodes having a same polarity that is opposite to the polarity of the first switching element and the third switching element, and
on the basis of the switching signal of the control unit, the first switching element and the second switching element operate in a complementary manner and the third switching element and the fourth switching element operate in a complementary manner.

5. The converter of claim 4, wherein the clamping unit is connected to the third switching element and the fourth switching element of the switching unit and has a first capacitor for clamping output power passed through the switching unit, and the first capacitor is of a film form to enhance power density and durability.

6. The converter of claim 1, wherein a first diode and a second diode of the rectifying unit and the fifth diode to the eighth diode of the shaping unit are composed of FET switching elements for bidirectional converting in which the AC power of the system into the DC power to charge the battery and a DC charging voltage of the battery is converted into the AC power of the system.

7. The converter of claim 6, wherein the single-stage interleaved soft switching converter is provided in such a manner to set a number of the coils of the PFC unit, a number of the switching elements of the switching unit, a number of transformers, and a number of the diodes of the shaping unit on the basis of an output phase desired to be expanded.

8. The converter of claim 7, wherein the single-stage interleaved soft switching converter further comprises a coupler coupling a first coil and a second coil of the PFC unit when there is an even number of expanded phases,
each of transformers for each phase is provided with series connection in which at a secondary side, one end of a first winding coil accesses one end of a second winding coil, or with parallel connection in which at the secondary side, the one end of the first winding coil accesses the one end of the second winding coil and at the secondary side, another end of the first winding coil is connected to another end of the second winding coil, and
the shaping unit for each phase is combined in series or in parallel between each transformer for each phase and the battery.

9. The converter of claim 8, wherein when the single-stage interleaved soft switching converter is provided with a plurality of single-phase input modules, each of the single-phase input modules is provided in one among a serial form and a parallel form, and
when the single-stage interleaved soft switching converter is provided with a plurality of multi-phase input modules, each of the multi-phase input modules is provided in series or in parallel.

10. A single-stage interleaved soft switching converter comprising:
a rectifying unit convening input AC power of a system into DC power;
an interleaving power factor correction (PFC) circuit provided to an output side of the rectifying unit, to control power factor and battery charging and current by single-stage soft switching;
a filter unit having a third coil and a fourth coil, provided to an output side of the interleaving PFC circuit in parallel, to remove a pre-determined frequency component;
a transformer provided between an input side and an output side of the fourth coil of the filter unit, to increase an output voltage of the filter unit according to a turns ratio thereof;
a shaping unit provided to an output side of the transformer to shape increased AC output power of the transformer;
a link unit outputting a DC link voltage and providing the output link voltage to a battery by charging and discharging output power of the shaping unit through a capacitor; and
a control unit generating and providing a switching signal for controlling switching elements of the interleaving PFC circuit, thereby controlling output voltage and current of the battery,
wherein the rectifying unit is provided with one among a full-wave bridge circuit including first to fourth diodes and a half bridge circuit in a totem-pole structure including first and second diodes,
wherein the interleaving PFC circuit comprises:
a PFC unit having a first coil and a second coil, provided to the output side of the rectifying unit in parallel to correct power factor of an output voltage of the rectifying unit;
a switching unit including: first and fourth switching elements connected to the first coil and the second coil, respectively and operating in a complementary manner, and second and third switching elements connected to the first coil and the second coil, respectively, and operating in a complementary manner; and
a clamping unit having a capacitor between the second switching element and the third switching element for clamping thereof,
wherein the first switching element and the third switching element are composed of FETs and diodes having a same polarity,
the second switching element and the fourth switching element are composed of FETs and diodes having a same polarity that is opposite to the polarity of the first switching element and the third switching element, and
on the basis of the switching signal of the control unit, the first switching element and the second switching element operate in a complementary manner and the third switching element and the fourth switching element operate in a complementary manner,
wherein the clamping unit is connected to the third switching element and the fourth switching element of the switching unit and has a first capacitor for clamping output power passed through the switching unit, and the first capacitor is of a film form to enhance power density and durability, and wherein the filter unit includes the third coil of which one end is connected to an end of the first coil of the PFC unit and the fourth coil connected between another end of the third coil and an end of the second coil, to shape an output current of the PFC unit.

11. The converter of claim 6, wherein the transformer is provided between the other end of the third coil and an end of the fourth coil, increases an excitation voltage of the third coil and the fourth coil according to the turns ratio and provides an output current to the shaping unit.

12. The converter of claim 11, wherein the shaping unit includes a fifth diode and a seventh diode that are connected to one end and another end of a secondary side winding coil of the transformer, respectively, and connected to one end of the battery, and a sixth diode and an eighth diode that are connected to the other end of the battery and connected to the one end and the other end of the secondary side winding coil of the transformer, respectively, so as to shape an increased output voltage of the transformer for provision to the link unit.

13. The converter of claim 12, wherein the link unit includes a second capacitor connected between one end of the fifth diode and of the seventh diode and another end of the sixth diode and of the eighth diode, and charges and discharges the output voltage of the transformer which has passed through the shaping unit to generate the link voltage and to provide the generated link voltage to the battery.

14. The converter of claim 12, wherein a first diode and a second diode of the rectifying unit and the fifth diode to the eighth diode of the shaping unit are composed of FET switching elements for bidirectional converting in which the AC power of the system into the DC power to charge the battery and a DC charging voltage of the battery is converted into the AC power of the system.

15. The converter of claim 14, wherein the single-stage interleaved soft switching converter is provided in such a manner to set a number of the coils of the PFC unit, a number of the switching elements of the switching unit, a number of the transformers, and a number of the diodes of the shaping unit on the basis of an output phase desired to be expanded.

16. The converter of claim 15, wherein the single-stage interleaved soft switching converter further comprises a coupler coupling the first coil and the second coil of the PFC unit when there is an even number of expanded phases, each of transformers for each phase is provided with series connection in which at a secondary side, one end of a first winding coil accesses one end of a second winding coil, or with parallel connection in which at the secondary side, the one end of the first winding coil accesses the one end of the second winding coil and at the secondary side, another end of the first winding coil is connected to another end of the second winding coil, and the shaping unit for each phase is combined in series or in parallel between each transformer for each phase and the battery.

17. The converter of claim 16, wherein when the single-stage interleaved soft switching converter is provided with a plurality of single-phase input modules, each of the single-phase input modules is provided in one among a serial form and a parallel form, and when the single-stage interleaved soft switching converter is provided with a plurality of multi-phase input modules, each of the multi-phase input modules is provided in series or in parallel.

* * * * *